(No Model.) 3 Sheets—Sheet 1.
A. H. BRAINARD.
GEAR CUTTING MACHINE.
No. 472,519. Patented Apr. 12, 1892.
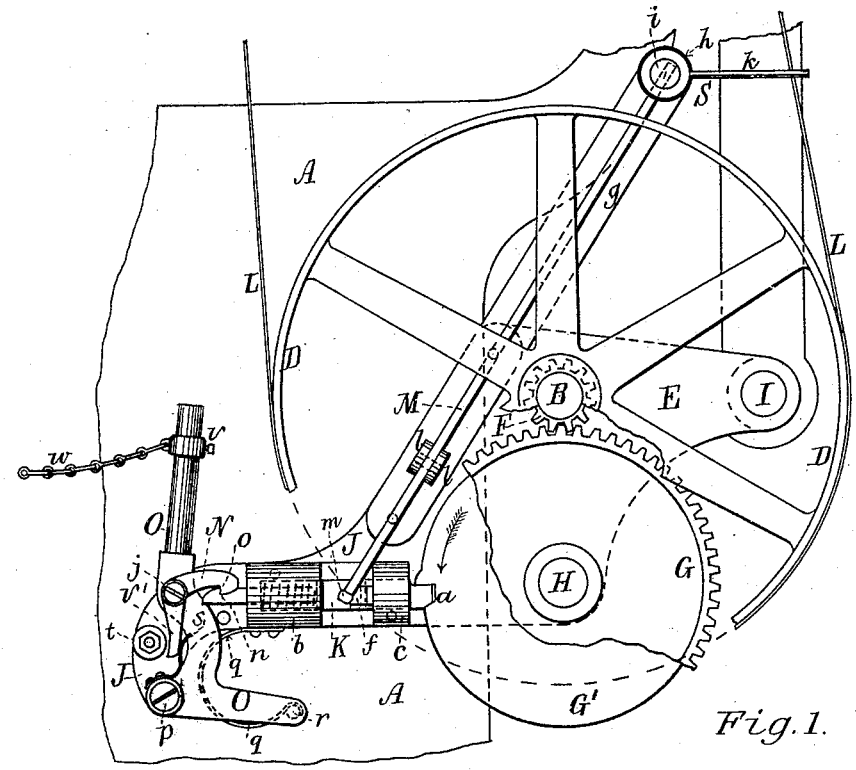
Fig. 1.
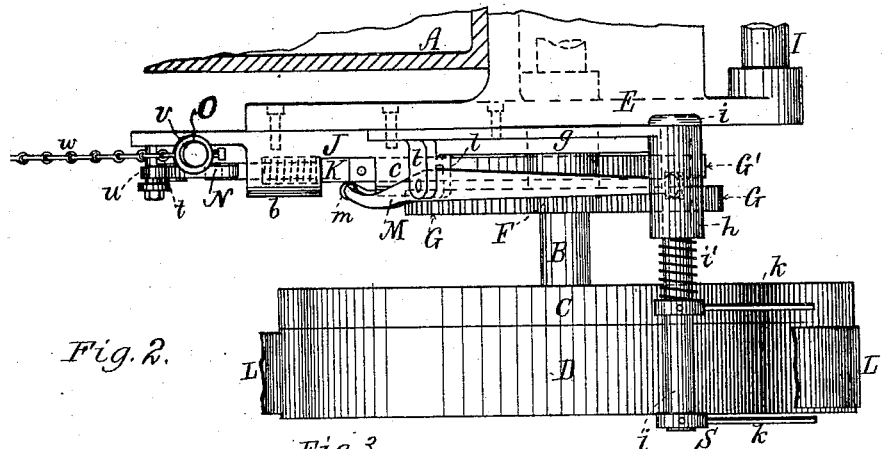
Fig. 2.
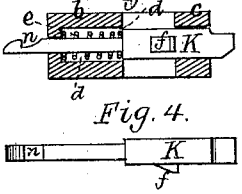
Fig. 3.
Fig. 4.
Fig. 5.
Witnesses
S. N. Piper
[signature]
Inventor
Amos H. Brainard (No Model.)  
3 Sheets—Sheet 2.
A. H. BRAINARD.
GEAR CUTTING MACHINE.
No. 472,519. Patented Apr. 12, 1892.
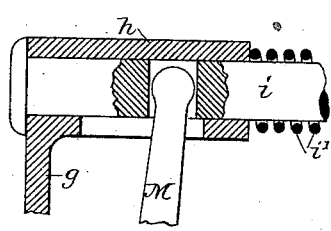
Fig. 13.
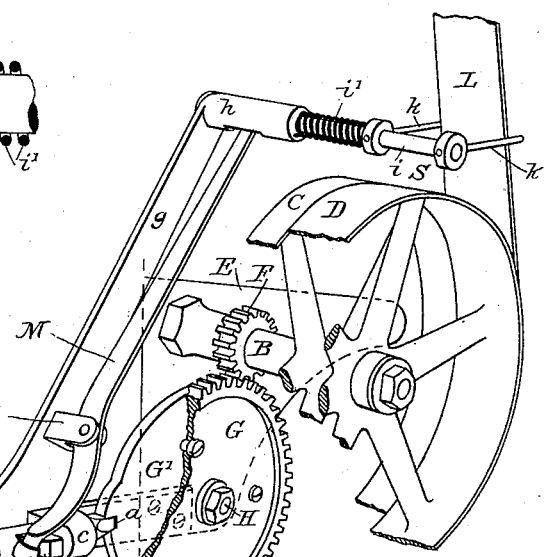
Fig. 6.
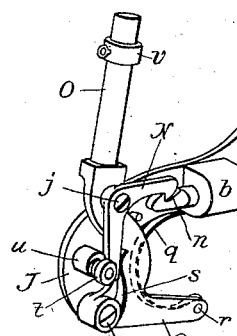
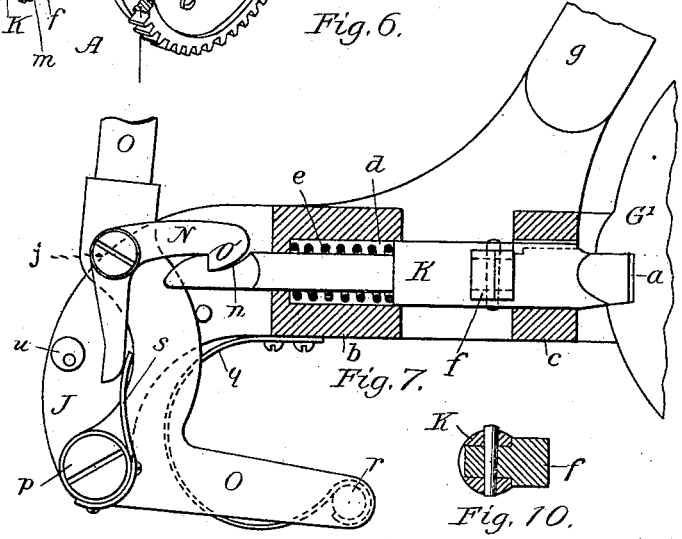
Fig. 7.
Fig. 10.
Fig. 8.
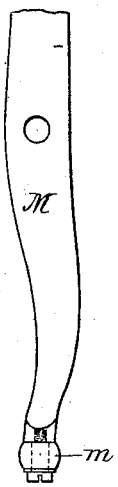
Fig. 9.
Witnesses.  
Eugene Humphrey  
Ralph W. E. Hopper
Inventor.  
Amas H. Brainard  
Jr. T. W. Porter Atty.

(No Model.) 3 Sheets—Sheet 3.

A. H. BRAINARD.
GEAR CUTTING MACHINE.

No. 472,519. Patented Apr. 12, 1892.

Witnesses.
Eugene Humphrey
Ralph W. E. Hopper

Inventor.
Amos H. Brainard

UNITED STATES PATENT OFFICE.

AMOS H. BRAINARD, OF HYDE PARK, MASSACHUSETTS.

GEAR-CUTTING MACHINE.

SPECIFICATION forming part of Letters Patent No. 472,519, dated April 12, 1892.

Application filed November 26, 1890. Serial No. 372,720. (No model.)

*To all whom it may concern:*

Be it known that I, AMOS H. BRAINARD, a citizen of the United States, residing at Hyde Park, in the county of Norfolk and State of Massachusetts, have invented certain new and useful Improvements in Gear-Cutting Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention hereinafter described relates to improvements in automatic gear-cutting machines and refers to a device for intermittingly applying power to the dividing mechanism, said device being an improvement on that shown and described in Letters Patent of the United States No. 310,796, granted on January 13, 1885, to Z. B. Coes and George W. Miller.

Figure 11:
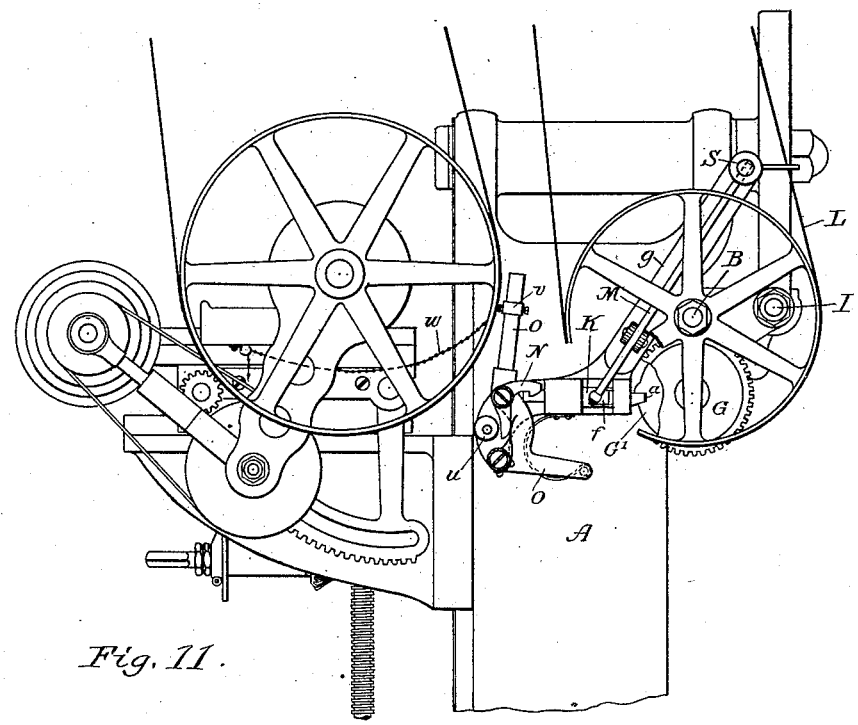
Figure 12:
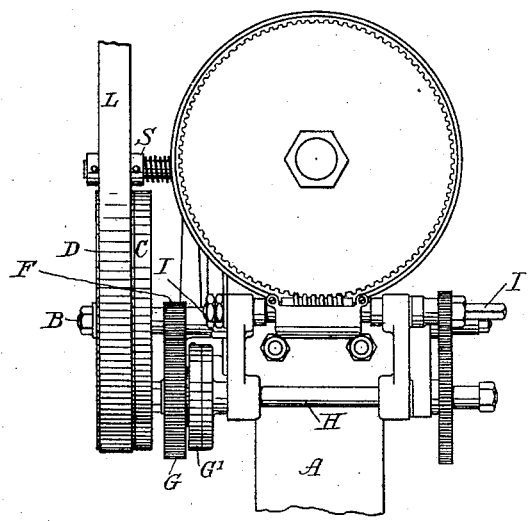

In the drawings, Figure 1 is a side elevation of a portion of the upper part of a gear-cutting machine, shown in side elevation. Fig. 2 is a top plan view of the same. Fig. 3 is a side elevation of the slide-bolt K, showing its bearings in vertical section. Fig. 4 is a plan view of said bolt. Fig. 5 is a longitudinal section of the eccentric-knob. Fig. 6 is a perspective view of the upper portion of the machine. Fig. 7 is a sectional elevation showing details of construction. Fig. 8 is an enlarged top plan view of the slide K and its bearing *f*. Fig. 9 is an enlarged side elevation showing the lower portion of lever M. Fig. 10 is a transverse section through slide K and its bearing *f*. Fig. 11 is a diminished side elevation showing the upper portion of the machine. Fig. 12 is a view taken at the right of Fig. 11. Fig. 13 is a detail view of parts of the belt-shipping device.

Similar letters refer to similar parts throughout the several views.

A denotes the frame of the machine, and B a stud, on which pulleys C and D are arranged, both pulleys being adapted to turn loosely thereon. The said stud is fixed to a bracket E, secured to the frame A. The hub of the pulley C is provided with a pinion F, which engages a spur-gear G, said gear being firmly secured to a disk G', provided with a notch *a* in its periphery and fixed to the adjacent end of a shaft H. To the other end of the said shaft is affixed the necessary spur-gear for operating, by means of somewhat similar spur-gears known as "change-gears," the worm-shaft I. (See Fig. 12.)

The parts thus far described are of the same general construction and have the same arrangement as those shown in Fig. 2 of the drawings of the patent hereinbefore referred to. In said patent the driving-belt which is in constant motion runs in contact with the face of the pulley which drives the change-gear mechanism, and as said pulley stands still much of the time undue wear and chafing of the belt and pulley and also loss of power results. By my improvement, which I will now proceed to describe, said wear and chafing and loss of power are obviated.

J represents a support-piece secured to the bracket E, said piece being supplied with bearings *b* and *c* for sustaining the latch or slide-bolt K, which locks the said disk G' in position. The bearing *b* is chambered at *d* (see Figs. 3 and 7) and has a spring *e* arranged therein and encompassing the shank of the bolt to throw said bolt forward at the proper time into the notch *a* of the disk G'. The bolt K is also provided with an inclined plane *f*, as shown.

Extending upward from the support-piece J is an arm *g*, provided at its top with a sleeve *h*, in which is arranged to slide a shipper S, consisting of a headed slide-rod *i* and two arms *k k* fixed thereto, the office of said shipper being to shift the belt L from the loose pulley D onto the pulley C, or vice versa, to operate at the proper time the change-gear mechanism. A spring *i'*, encompassing said slide-rod, bears against the sleeve *h* and the next adjacent arm *k* and moves said slide-rod in a direction opposite to that in which it is moved by the lever M, to be hereinafter described. The slide-rod *i* is connected to the upper end of the longer arm of a lever M, the fulcrum of which is in ears *l*, projecting from the arm *g*, the shorter arm of said lever having an anti-friction roll *m* bearing on the inclined plane *f* of the slide-bolt K. The end of the shank of the bolt K, extending beyond the bearing *b*, is notched at *n* and engages the hooked end *o* of a lever-latch N, the fulcrum j of which is in a lever O, the latter lever being fulcrumed at p to the lower end of the support-piece J. (See Figs. 1, 6, and 7.)

A spring q, secured to the under side of the bearing b, bears at its free end on a pin r, projecting inward from the end of the shorter arm of the lever O. Another spring s, secured to said lever O, bears at its free end against the tail of the latch N and depresses its hooked end o into position to engage the notched end of the slide-bolt K when in the position shown in Fig. 1. t is a knob provided with an eccentric u and pivoted to the support-piece J, said eccentric being adapted to disengage the catch N from the slide-bolt K at the proper time during the movement of the upper arm of the lever O to the left. A chain w is connected to a collar v, adjustably secured on the upper arm of the lever O, the opposite end of said chain being connected to the cutter-slide (see Fig. 11) of an automatic gear-cutting machine. What is known as the "return motion" of said cutter-slide imparts to the lever O, through the medium of the chain w, the necessary movement for releasing the slide-bolt K from the notch a in the disk G'. The collar v is made adjustable on the said upper arm of the lever O, for the purpose of increasing or diminishing the movement of said lever when it is desirable.

The slide-bolt K is operated in the following manner: After a cutter has passed through the gear-blank to be cut and during the return of the cutter for a fresh cut motion is imparted through the medium of the chain w, lever O, and latch-lever N to the slide-bolt K, said slide-bolt being withdrawn sufficiently from the notch a in the disk G' to allow said disk to be revolved in the direction indicated by the arrow in Fig. 1. The chain w is adjustably attached to the cutter-slide, so that it shall not become taut during the return motion of said cutter-slide, or until the cutter has passed sufficiently clear of the blank to be cut to permit the said blank to be revolved. Secured to the slide-bolt K is an inclined plane f. The movement of the slide-bolt K when being withdrawn from the notch a in the disk G' causes the inclined plane f to come in contact with and impart motion to the lower or shorter arm of the lever M, the upper or long arm of said lever being attached to the headed slide-rod i of the shipper S. Motion is thereby imparted to shipper S, said shipper causing the belt L to run from the pulley D onto the pulley C, that carries the pinion F. The instant the slide-bolt K is released from the notch in the disk G' said disk will revolve in the direction indicated by the arrow shown in said Fig. 1, impelled by motion from pinion F and imparting the same to its shaft H and the change-gears thereby operated. (See Fig. 12.) The tail of the latch-lever N is brought in contact with the adjustable eccentric-stop u by movement of the lever O, thus disengaging its hooked end o from the notch in the slide-bolt K as soon after the said slide-bolt has been disengaged from the notch a in the disk G' as may be practicable, and permitting the spring e to expand and return the slide-bolt against the periphery of said disk G', and on completion of a revolution of said disk the slide-bolt K is again seated in the notch a of the said disk by the further expansion of the spring e. The lever M now being out of contact with the incline f of the slide-bolt, the spring i' will instantly operate the shipper S and move the belt L from the pulley C to the pulley D. By adjusting eccentric u on its pin t the action of lever O in releasing catch N from slide K may be arranged with the requisite degree of accuracy.

Having thus described my improvements, what I claim is—

1. A gearing for intermittently applying power to the spacing device of an automatic gear-cutting machine, the same consisting of a pulley geared and arranged to drive the change-gear mechanism, and a loose pulley, and means, substantially as described, for intermittently moving the driving-belt from one pulley to the other, said means being composed of a shipper, a support therefor, a shipper-operative lever fulcrumed to said support, a slide-bolt sustained in bearings therein, said bolt provided with an incline for moving the shipper-lever on disengagement of said slide-bolt from disk G', a spring for reseating the slide-bolt in said disk, a lever-latch for retracting said bolt, a lever O, fulcrumed to the support-piece, provided with springs s q, and the eccentric for adjusting the lever-latch in relation to the slide-bolt, said lever O connected to the slide of the machine for swinging it on its fulcrum, all substantially as specified.

2. The combination, with the gearing, of slide K, arm g, shipper S, lever M, and arm O, with its adjustable chain w, lever N, springs s q, and eccentric u, all substantially as specified.

3. The combination, with the feed-shaft I of a gear-cutting machine, of shaft H, connected therewith by suitable change-gears, disk G', engaged by the slide K, gear G, connected with disk G', pinion F, engaging gear G and carried by pulley C, the pulleys C D, belt L, shipper S, and automatic devices for working slide K, all substantially as specified.

4. The notched disk G', slide-bolt K, with its inclined plane, and spring e, lever M, rod i, spring i', and shipper-arms k k, all substantially as shown, and for the purpose set forth.

In testimony whereof I affix my signature in presence of two witnesses.

AMOS H. BRAINARD.

Witnesses:
S. N. PIPER,
C. F. DANIELS.